United States Patent [19]

Peters

[11] 4,084,613
[45] Apr. 18, 1978

[54] COMBINATION HIGH-LOW PILOT VALVE

[75] Inventor: Clifford M. Peters, Longview, Tex.

[73] Assignee: W-K-M Wellhead Systems, Inc., Shreveport, La.

[21] Appl. No.: 750,296

[22] Filed: Dec. 13, 1976

[51] Int. Cl.² .................................................. F16K 11/00
[52] U.S. Cl. ................................ 137/596.18; 137/458; 137/625.66
[58] Field of Search ............... 137/458, 625.66, 596.18

[56] References Cited

U.S. PATENT DOCUMENTS

| 3,621,881 | 11/1971 | Vicari | 137/625.66 |
| 3,716,074 | 2/1973 | Peters | 137/625.6 |
| 3,746,047 | 7/1973 | Peters | 137/625.66 |
| 3,863,672 | 2/1975 | Theriot et al. | 137/596.18 |
| 3,943,974 | 3/1976 | Connelly et al. | 137/625.66 X |
| 3,977,438 | 8/1976 | Muchow | 137/625.66 |
| 3,996,965 | 12/1976 | Peters | 137/625.66 |

Primary Examiner—William R. Cline

[57] ABSTRACT

A combination high-low pilot valve includes an elongate slide valve in a central bore of the pilot valve biased by a low pressure spring toward an open end of the bore which is in fluid communication with a primary fluid system. A secondary valve member in the bore controls the opening and closing of a high pressure bleed port and is positioned between the elongate slide valve and a high pressure spring in concentric relation to the low pressure spring. The high pressure spring biases the secondary valve member continuously toward the slide valve. The slide valve is spaced longitudinally from the secondary valve member in normal operating position and upon a continued movement after the high pressure is reached contacts the secondary valve member and moves the secondary valve member to a bleed position. The high pressure bleed port is connected directly to the fluid outlet line from the pilot valve mechanism and upon the reaching of a high pressure above the operating range, fluid is bled from the outlet line directly through the high pressure bleed port which is opened by the secondary valve member and by-passes the outlet port which is blocked by the slide valve.

14 Claims, 5 Drawing Figures

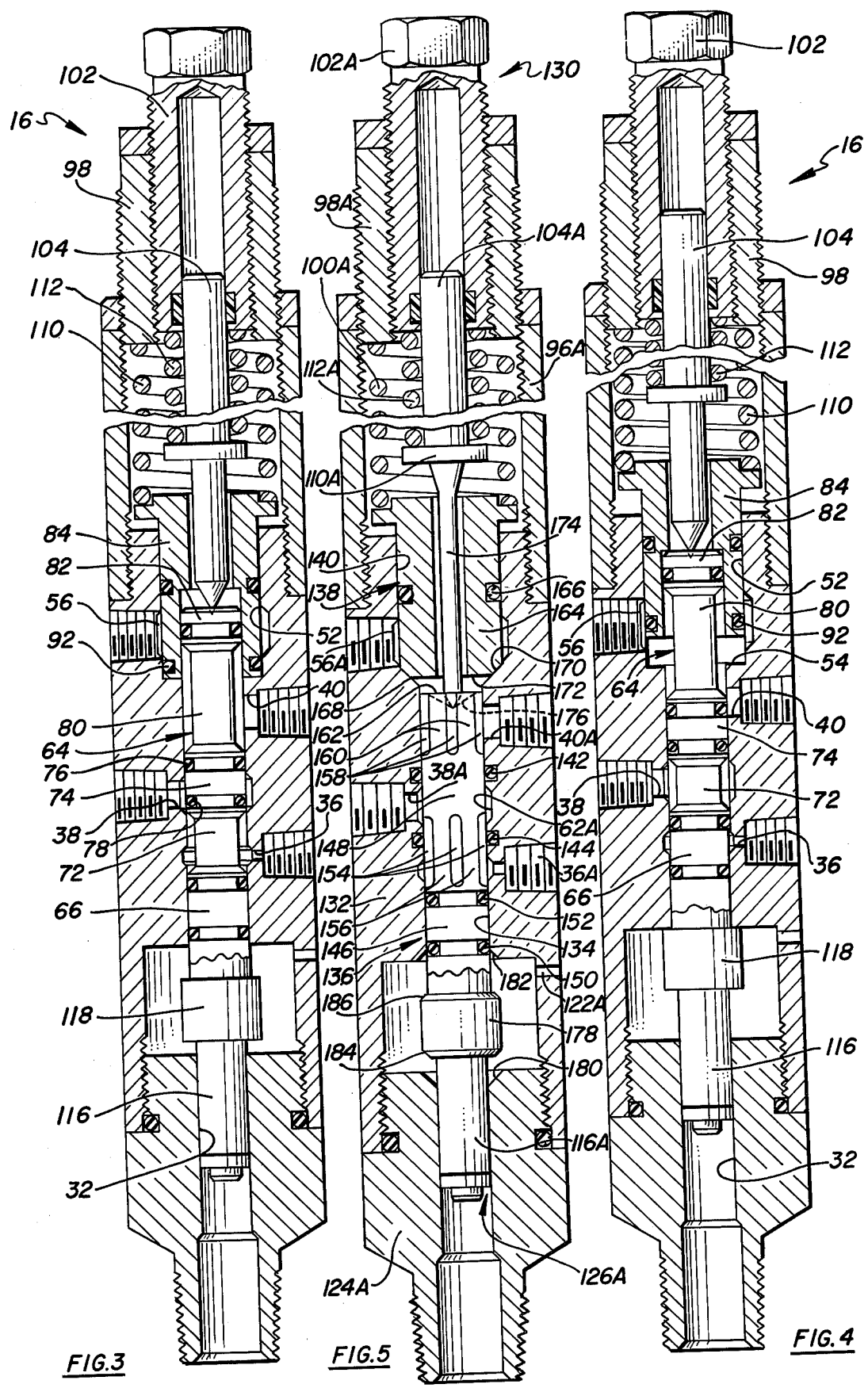

COMBINATION HIGH-LOW PILOT VALVE

BACKGROUND OF THE INVENTION

This invention is related to fluid control system pilot valves which sense a pressure in a system and control the flow of fluid to some pressure actuated device in the event the sensed pressure rises above or drops below predetermined values.

Several pilot values are known in the art which will perform a generally similar function to the pilot valve of this invention. As an example of the known patented prior art pilot valve structures, reference is made to U.S. Pat. Nos. 3,621,881, dated Nov. 23, 1971; 3,716,074, dated Feb. 13, 1973; and 3,863,672, dated Feb. 4, 1975.

Such prior art combination high-low pressure responsive pilot valve mechanisms have a relatively large dead band or range of intermediate pressures which are not sufficiently high or low to actuate the mechanism thus making it undesirable for situations requiring fine control through a narrow range of pressures. Further, the rate of bleeding or exhausting an associated valve actuator has been relatively slow which further makes such prior art pilot valve mechanisms undesirable. When only a pilot valve is employed for bleeding an associated valve actuator to permit a controlled valve to close or shut in, it is highly desirable that a fast rate of exhausting the actuator be obtained so that associated valve will move to a closed position in a minimum of time.

In addition, the prior art arrangements have utilized the outlet port of the pilot valve mechanism for bleeding off the valve actuator under both high pressure and low pressure conditions. The outlet port heretofore has been of a relatively small cross-sectional area to permit a fluid seal to easily move across the outlet port for bleeding the actuator under both low pressure and high pressure conditions. Thus, the size of the outlet port has controlled the rate of bleed off of the fluid from the actuator when pilot valves have been utilized for bleeding valve actuators.

BRIEF DESCRIPTION OF THE PRESENT INVENTION

The combination high and low pressure responsive pilot valve mechanism of this invention includes an elongated valve body having a central bore therein forming a valve chamber with inlet, outlet, and bleed ports extending through the body to the bore. A main valve member comprises an elongated slide valve mounted within the bore for sliding movement and has an end thereof exposed to fluid pressure from a main flowline or pressurized primary system which is being sensed. The outlet port is connected to a fluid powered valve actuator and the inlet port is connected to a fluid supply. The slide valve is movable between three positions; a normal operating position in a predetermined fluid pressure operating range, a low pressure position at a fluid pressure below the predetermined operating range, and a high pressure position at a fluid pressure above the predetermined operating range.

A secondary valve member is mounted adjacent the other end of the elongated slide valve and controls the opening and closing of a high pressure bleed port which is connected directly to the fluid outlet line from the pilot valve. A low pressure spring acts against the main slide valve and a high pressure spring acts against the secondary valve member. The slide valve in normal operating position is spaced longitudinally from the secondary valve member and is movable upon the reaching of a predetermined high presure a limited distance toward the secondary valve before contacting the secondary valve member.

The high pressure bleed port is blocked by the secondary valve member at normal operating and low pressure positions, and the outlet port is blocked by the slide valve at the high pressure position. When the slide valve contacts the secondary valve upon continued movement of the slide valve after a high pressure condition is reached, the secondary valve is moved longitudinally to open the high pressure bleed port with the fluid being bled directly from the high pressure bleed port and by-passing the outlet port.

Both the high pressure bleed port and the outlet port which also acts as the low pressure bleed port are of a relatively large cross-sectional area which permits a relatively fast bleeding of fluid from the fluid outlet line. In the low pressure position, the O-ring which has blocked the vent port is moved to a position intermediate the width of the outlet port and does not have to move completely across the outlet port. In the high pressure position, the O-ring which has blocked the flow of fluid to the high pressure bleed port in the normal operating position is moved to a position intermediate the width of the high pressure bleed port and does not have to move completely across the high pressure bleed port. This permits the use of a relatively large outlet port and a relatively large high pressure port with a corresponding relatively small longitudinal movement of the slide valve and the secondary valve member.

An object of this invention is to provide a combination high-low pilot valve mechanism which has a relatively high bleed-off rate at both high and low pressure positions.

Another object of this invention is to provide a combination high-low pilot valve mechanism in which a secondary valve member is mounted adjacent an end of an elongated slide valve and controls the opening of a high pressure bleed port which is connected directly to the fluid outlet line from the pilot valve mechanism.

Another object of this invention is to provide a combination high-low pilot valve mechanism which has a relatively small dead band or intermediate pressure range which will not cause actuation of the pilot valve mechanism.

Yet, another object of this invention is to provide a combination high-low pressure or pilot valve mechanism which requires only slight movement of the valve members thereof to achieve control of fluid communication therethrough.

Various other objects, advantages, and features of this invention will become apparent to those skilled in the art from the following discussion, taken in conjunction with the accompanying drawings, in which:

DESCRIPTION OF THE DRAWINGS

FIG. 3 is a sectional view of the pilot valve mechanism of FIG. 2 with such shown in the normal operation position;

FIG. 4 is a sectional view of the pilot valve mechanism of FIG. 2 with such shown in the high pressure position; and FIG. 5 is a sectional view of another embodiment of the pilot valve mechanism of this invention employing metallic seats in portions of the valve structure and shown in the normal operating position.

Figures 1, 2:
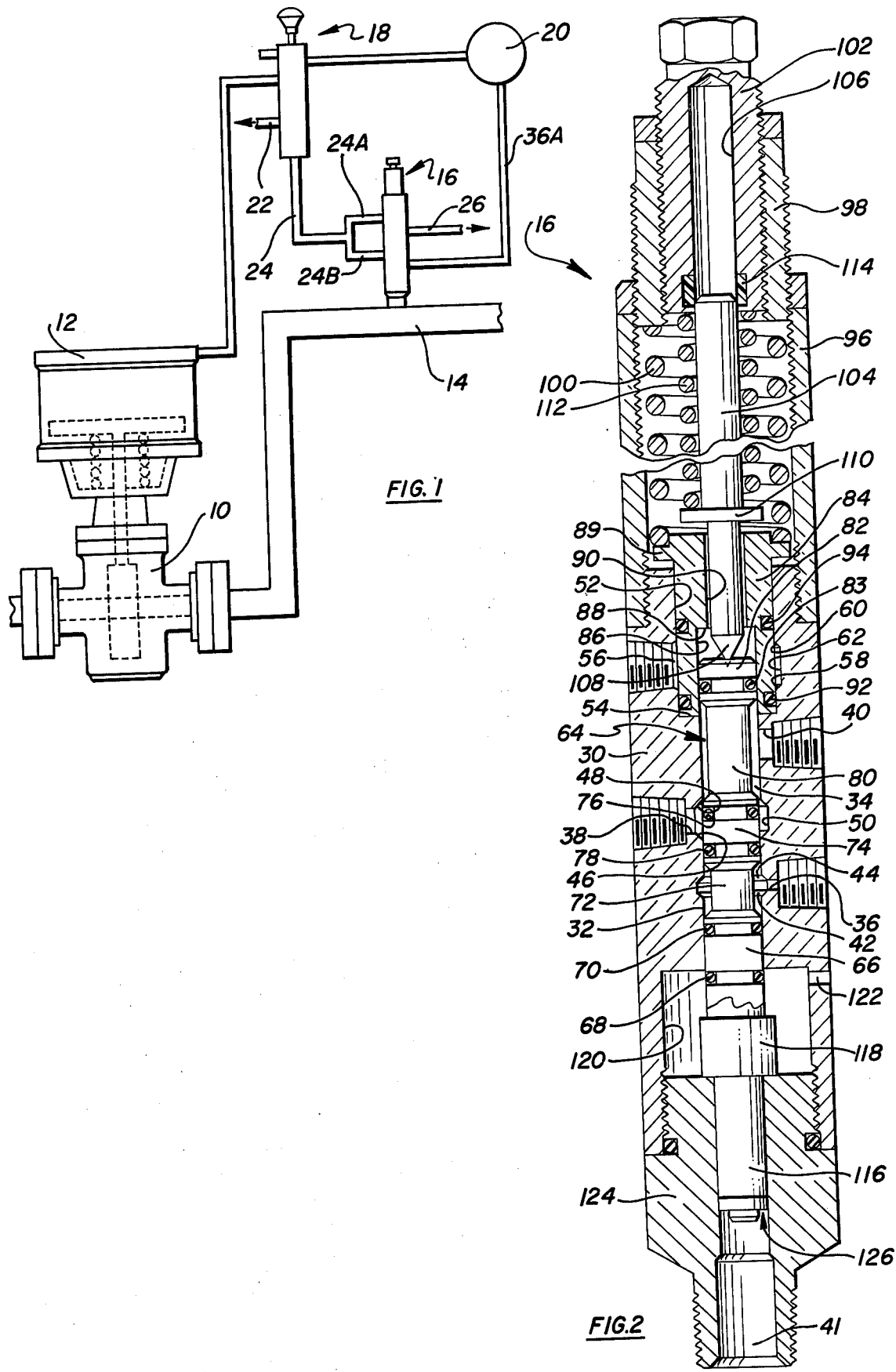
FIG. 1 is a schematic representation illustrating the present invention incorporated in a control system for a fluid powered actuator on a valve mounted in a conduit that carries a pressure monitored fluid.
FIG. 2 is a sectional view of an embodiment of the pilot valve mechanism of this invention with such shown in the low pressure position.

The following is a discussion and description of preferred specific embodiments of the pilot valve mechanism of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Referring now to FIG. 1 of the drawings wherein a pilot valve controlled pressurized fluid containing system is shown. The system includes a flow control valve 10 having a fluid powered piston and cylinder type actuator 12 operably mounted thereon, a main flawline conduit 14 connected to valve 10, a pressure responsive pilot valve mechanism 16 of this invention in fluid communication with the conduit 14, a reset pilot valve 18 in fluid communication with valve actuator 12 and pressure responsive pilot valve 16, and a control fluid supply 20 connected to pressure responsive pilot valve 16 and pilot valve 18. For convenience pressure responsive pilot valve mechanism 16 is referred to as pilot valve 16. In this system valve 10 moves between open and closed positions to control the flow of fluid through conduit 14. Movement of valve 10 is accomplished by valve actuator 12 which in turn is controlled by pilot valve 16 and reset pilot valve 18. Pilot valve 18 is a two position high volume control valve which in one position connects supply 20 to above actuator 12 to move actuator 12 to the open position, and in a second position blocks fluid flow from supply 20 and opens fluid connection between actuator 12 and a bleed to remove or dump fluid from actuator 12. The bleed for reset pilot 18 is illustrated with a conduit at 22 which can be a simple vent to the atmosphere or a return line to a hydraulic sump depending upon the specific configuration of a particular system. Quick bleed pilot 18 must be manually reset to establish flow from supply 20 to actuator 12. Once the system is in operation fluid pressure from supply 20 passes through pressure responsive pilot valve mechanism 16, which is then in a normal operating position, to maintain the open position of quick bleed pilot 18. A conduit 24 joins the outlets of pilot valve 16 to the pressure sensing port of quick bleed pilot 18. Pilot valve 16 senses the pressue in conduit 14 and depending upon this pressure permits fluid communication from supply 20 to the pressure sensing port on pilot valve 18, or blocks the communication from supply 20 and bleeds the fluid from conduit 24 and pilot valve 18. This results in pilot valve 18 changing position to block fluid from supply 20 and to dump fluid from actuator 12 through bleed 22. A conduit 26 is connected to the bleed port of pilot valve 16 for passing the control system to a reservoir if necessary. It is to be understood that conduit 26 can be eliminated if air or nitrogen gas is used and such is to be dumped into the atmosphere. For further details of pilot valve 18 reference is made to U.S. Pat. No. 3,943,974, dated Mar. 16, 1976, the entire disclosure of which is incorporated by this reference.

Pilot valve mechanism 16 includes an elongated valve body 30 having an elongated body 32 therein opening on the lower end portion of valve body 30. Bore 32 defines a portion of valve chamber 34. The open end of bore 32 is adapted to place valve chamber 34 in fluid communication with a pressurized primary system such as conduit 14 in the system described above. Valve body 30 is provided with an inlet port 36, an outlet port 38, and a bleed port 40 which provide fluid communication to valve chamber 34. Inlet port 36 is located on what will be referred to as the lower end portion of valve body 30. Outlet port 38 is spaced above inlet port 36, and bleed port 40 is spaced above outlet port 38. A pressure sensing port 41 is provided on the lower end of valve body 30 to establish fluid communication between bore 32 and a pressurized primary system. Inlet port 36 joins valve chamber 34 at a peripherally enlarged bore portion which is comprised of a pair of frusto-conical surfaces 42 and 44 extending outwardly from bore 32 and mutually inclined toward each other forming sealing edges at the juncture of such surfaces and bore 32. Outlet port 38 similarly joins bore 32 at a peripherally enlarged bore portion defined by a pair of frusto-conical surfaces 46 and 48 extending outwardly from bore 32, mutually inclined toward each other and joined on their perimeter by a cylindrical peripheral surface 50. The upper portion of the valve chamber 34 has an enlarged generally cylindrically shaped bore portion 52 joined by a radially disposed abutment 54 with bore 32. A high pressure bleed port 56 is provided through valve body 30 joining valve chamber 34 at a peripherally enlarged portion of an enlarged bore portion 52. The peripherally enlarged portion of enlarged bore 52 has a pair of frusto-conical surfaces 58 and 60 joined by a generally cylindrical peripheral surface 62. Surfaces 58 and 60 define sealing edges at the juncture of such surfaces and enlarged bore 52. Line 26 is connected to bleed port 40. Branch line 24A is connected to high pressure bleed port 56 and branch line 24B is connected to outlet port 38. Line 36A connects inlet port 36 to fluid supply 20.

The first valve means includes a first valve member comprising an elongated slide valve indicated generally at 64 and extending through the mid and lower portions of valve chamber 34. Slide valve member 64 has a cylindrical segment 66 on its lower portion bounded by O-rings 68 and 70 mounted in peripheral grooves in the valve member. A reduced diameter portion of valve member 64 adjoins the upper end portion of cylindrical portion 66. Opposing inclined surfaces define the opposing upper and lower ends of reduced diameter portion 72. A second cylindrical portion 74 adjoins the upper end of reduced diameter portion 72 and O-rings 76 and 78 extend about the upper and lower ends thereof respectively. Second cylindrical portion 74 is substantially shorter than first cylindrical portion 66 as clearly shown in the drawings. The spacings of O-rings 76 and 78 is narrower then the spacing between the sealing edges of the peripherally enlarged bore portion at outlet 38. Because O-rings 76 and 78 are spaced closer than the sealing edges defined by surfaces 46 and 48 only one O-ring of the O-rings will be engaged with a sealing edge or bore 32 at any given time. A second reduced diameter portion 80 adjoins the upper portion of second cylindrical portion 74 with such extending to the upper end portion of first valve member 64. A third cylindrical portion 82 is provided on the extreme end portion of first valve member 64. An O-ring 83 mounted in a peripheral groove around third enlarged portion 82 seals this portion of valve member 64 in the bore in which it rests.

A second valve means enclosed in valve body 30 is located in the upper end portion of valve chamber 34 and includes a hollow generally cylindrical second valve member 84 slidably mounted in enlarged bore portion 52. The interior of second valve member 84 has an enlarged bore portion 86 extending from a mid-portion thereof to the lower end thereof which receives and mounts third cylindrical portion 82. Enlarged bore portion 86 has a radially disposed abutment 88 at the inner end thereof connecting enlarged bore portion 86 and a smaller diameter bore portion 90 which extends to the upper end of second valve member 84. When first valve member 64 moves to the high pressure position the upper end of first valve member 64 contacts radial abutment 88 before the first valve member actually gets to the ultimate resting point of high pressure position. As first valve member 64 moves to the high pressure position it raises second valve member 84 thereby placing it in the open position. A pair of O-rings 92 and 94 are mounted in grooves around the exterior of second valve member 84. O-rings 92 and 94 are disposed on opposite sides of the peripherally enlarged bore portion adjoining the high pressure bleed port 56. Second valve member 84 is provided with a radially outwardly extending spring support lip 89 on the upper end portion thereof. Valve member 84 thus controls the opening and blocking of high pressure bleed port 56 which is of a relatively large cross-sectional area. In the open position shown in FIG. 4 under a high pressure condition, O-ring 92 is positioned intermediate the width of port 56 and does not have to move across port 56.

A spring assembly includes a spring support coupler 96 threadedly mounted with valve body 30 which in combination with the spring adjustment members forms the upper end portion of the pilot valve mechanism. A hollow outer spring adjustment member 98 is threadedly mounted in the upper end portion of spring support coupler 96 and a helical spring 100 is retained in compression between the inner end of spring adjustment member 98 and second valve member spring support lip 89. An inner spring tension adjustment member 102 is threadedly mounted through outer spring adjustment member 98 in co-axial relation. Inner spring tension adjustment member 102 has a bore 106 therein opening on the lower end thereof to receive an inner spring support member 104. Spring support member 104 has its upper end slidably mounted in bore 106. The lower end of spring support member 104 has a conical point 108 resting in a recess in the upper end of first valve member 64. A spring abutment member 110 extends radially outward from spring support member 104 and acts in cooperation with the lower end of inner spring tension adjustment member 102 to compressively contain a helical spring 112. Spring 112 urges spring support member 104 into contact with the upper end of first valve member 64. A sleeve 14 of lower friction material is provided in bore 106 to reduce sliding friction on spring support member 104 as it moves up and down in spring tension adjustment member 102.

The displacing means of valve mechanism 16 includes a piston 116 on the lower end of first valve member 64. Piston 116 is slidably mounted in the lower portion of bore 32 with one side exposed to fluid communication through pressure sensing port 41. Piston 116 transmits the fluid pressure force from the fluid system being monitored to mechanical force acting on first valve member 64 in opposition to inner spring 112. Valve body 30 is provided with an enlarged bore portion 120 in the lower portion thereof which receives and encloses an enlarged portion 118 of piston 116. A vent 122 is provided through valve body 30 to vent the chamber defined by enlarged bore portion 120. To facilitate assembly of the pilot valve, valve body 30 is provided with a threadedly mounted lower end portion 124. The lower end of body lower end portion 124 is threaded on the exterior thereof around pressure sensing port 41 to facilitate connecting pressure responsive pilot valve mechanism 16 to a fluid source which is to be monitored. Piston 116 is provided with a low friction seal 126 on its lower and exposed end portion. Seal 126 has a generally cylindrical low friction outer surface sealingly engaged with bore 32 so piston 116 and first valve member 164 can slide freely in bore 32. Piston 116 is placed in fluid communication with the fluid of a monitored system through pressure sensing port 41.

FIG. 2 shows pilot valve 16 in the low pressure position, which is the position it assumes when pressure in the system being monitored drops below the lower limit pressure for the system. Pilot valve 16 also assumes the position shown in FIG. 2 when it is not connected to a system. In this low pressure position inlet port 36 is blocked, outlet port 38 is in open fluid communication with bleed port 40, and high pressure bleed port 56 is blocked.

FIG. 3 shows pilot valve 16 in its normal operating position which is the position it assumes when a system having the pilot valve mechanism is in normal operation. With reference to FIG. 1, pilot valve 16 is in the normal operating position when fluid supply pressure is communicated through both pilot valve 18 and pilot valve 16, and valve 10 is in the open position so that fluid can flow through conduit 14. In the normal operating position inlet port 36 is in open fluid communication with outlet port 38 while bleed port 40 and high pressure bleed port 56 are blocked. Furthermore, in this normal operating position piston enlarged piston 118 resides in the mid-portion of the chamber enclosing same, first valve member 64 is located in the position shown with O-ring 76 engaged with bore 32 above the peripherally enlarged bore portion connecting to outlet port 38, and O-ring 78 is disengaged from bore 32. The position of pilot valve 16 allows fluid pressure from supply 20 to be communicated to inlet port 36, outlet port 38, conduit 24 into the pressure sensing port of pilot valve 18 which is essential for pilot valve 18 to remain in the open position. With pilot valve 18 open fluid is communicated under pressure from supply 20 to actuator 12 for maintaining such in the open position which in turn positions gate valve 10 in the open position.

FIG. 4 illustrates the position of pilot valve 16 in the high pressure position wherein first valve member 64 is displaced to its uppermost position and second valve member 84 is moved by valve member 64 to open bleed port 56. With pilot valve 16 in this condition, inlet port 36 is blocked by first cylindrical portion 66, outlet port 38 is blocked by the seals on the opposite side of the first reduced diameter portion 72, and high pressure bleed port 56 is in open fluid communication with bleed port 40. Also when pilot valve 16 is in the position shown in FIG. 4, springs 110 and 112 are compressed, first valve member 64 is in its maximum up position, piston enlarged portion 118 is in contact with valve body 30 and second valve member 84 is resting on the upper end of first valve member 64. Operationally, when pilot valve 16 is in the position shown in FIG. 4, fluid pressure in conduit 24 between the pilot valve 16 and pilot valve 18 is bled through pilot valve 16 and conduit 26 to a reservoir or to atmosphere and such causes pilot valve 18 to change from its normal operating position to a bleed position so fluid from actuator 12 is bled through conduit 22 with the end result being that valve 10 is moved to the closed position. Once pilot valve 16 is moved to the high pressure position is remains in this high pressure position only briefly or for a short period of time until the pressure in conduit 14 or any other pressure source which it is monitoring drops to the normal pressure level or below.

A feature of pilot valve 16 is in the use of a secondary valve member 84 which controls the opening and blocking of a high pressure bleed port 56 which is connected directly to the fluid outlet line from pilot valve 16 and is of a relatively large cross-sectional area. When a high pressure condition is reached and bleed port 56 is opened, the outlet port 38 is by-passed and fluid is bled from the outlet line without passing through outlet port 38 which is blocked and closed in the high pressure position. A very fast high pressure bleed is thus provided by this arrangement.

Another advantage of pilot valve 16 over the prior art pilot valve structures is that only a small movement of first valve member 64 is needed to change the operating function of the pilot valve. For example, to change pilot valve 16 from the normal operating position to the low pressure position it is only necessary to move first valve member sufficiently to engage O-ring 78 in bore 32. Moving the first valve member to this position blocks inlet port 36 and opens fluid communication from outlet port 38 to bleed port 40.

One distinct advantage of this pilot valve structure over some of the prior art is that this pilot valve is a non-bleed type as opposed to some prior art devices which are designed to bleed in order to operate. The devices which are required to constantly bleed to operate are considered undesirable because of the amount of extra equipment necessary for their operation, particularly when hydraulic supply fluid is used. Also, continuous bleeding requires a continuous flow from the control fluid supply and this severely limits using pressurized fluid in exchangeable bottles or containers for the supply fluid.

Another feature of the pilot valve mechanism of this invention is that when valve member 84 is moved to the open position as soon as O-ring 92 moves away from the sealing edge defined by inclined surface 58 and enlarged bore portion 52, the pressure in the valve chamber immediately below second valve member 84 will assist in further displacement of the second valve member thereby rapidly opening the second valve means. Because pilot valve 16 employs only one sliding member which is displaced from the fluid pressure of the medium which is to be monitored, and the second valve means is remotely located relative to the pressure medium which is monitored, the possibility of sticking is greatly reduced.

FIG. 5 illustrates an additional embodiment of the pressure responsive pilot valve mechanism of this invention with such incorporating metallic seating elements in the second valve means, and having a first valve means which is designed for extremely high pressure service with a metallic seating structure in the piston portion of the displacing means to prevent leakage in case of resilient seal failures. It should be noted that normal operating pressures for the supply in a system such as shown in FIG. 1 are in the range of 150 PSI to 300 PSI and pilot valve 16 is designed to operate in this pressure range. However, in some instances, particularly where the flowline pressure of the fluid being monitored is used as the control fluid supply, then operating supply pressure can be as high as 5,000 PSI. Pilot valve 130 is designed for use in this higher pressure situation. This second embodiment of the pressure responsive pilot valve mechanism is indicated generally at 130 and shown in the normal operating position. Pilot valve 130 is very similar in construction to some portions of the previously described pilot valve mechanism 16. For convenience similar portions of pilot valve mechanism 130 are given the same reference numerals as pilot valve mechanism 16 followed by the letter "A". Pilot valve 130 has a metallic valve body 132 with an elongated bore 134 therethrough opening on the lower end thereof. A first valve member indicated generally at 136 is slidably mounted in bore 134 in the mid and lower portions thereof. A second normally closed valve member 138 is slidably mounted in the upper portion of the valve bore in an enlarged bore portion 140. Valve bore 134 defines a valve chamber through the mid-portion of the valve body 132. Inlet port 36A, outlet port 38A, bleed port 40A, and high pressure bleed port 56A are positioned in valve body 132 similar to the inlet, outlet, and bleed ports of pilot valve 16. Inlet port 36A, outlet port 38A, and high pressure bleed port 56A join the valve chamber at peripherally enlarged portions of the bore. A pair of O-rings 142 and 144 are provided around the bore 134 in peripheral grooves in valve body 132 and disposed on opposite sides of the peripherally enlarged bore portion connected with outlet port 38A. First elongated valve member 136 includes a cylindrical portion 146 on a lower portion thereof which joins a fluted valve segment on the upper portion thereof. The fluted valve segments include a cylindrical mid-portion with fluted portions on opposite upper and lower ends thereof with the lower fluted portion adjoining a cylindrical portion 146. Cylindrical portion 146 is bounded by a pair of O-rings 150 and 152 mounted in grooves around the first valve member. The lower fluted portion adjoining cylindrical portion 146 is provided with a plurality of recesses or slots 154 which are spaced apart or separated by a plurality of partially cylindrical segments 156. Slots 154 extend from a point adjacent O-rings 152 and terminate at the lower end of cylindrical portion 148. On the opposite or upper end portion of first valve member 136 a plurality of recesses or slots 158 are formed in the valve member in a spaced relation separated by a plurality of partially cylindrical segments 160. Recesses or slots 158 extend upwardly from the upper portion of cylindrical portion 148 to the upper end of valve member 162 and have open upper ends. Slots 154 function to provide communication between inlet 36A and outlet 38A when pilot valve mechanism 130 is positioned for normal operation as shown in FIG. 5. In this instance fluid flow is through inlet port 36A around the adjoining peripherally enlarged portion of bore 134, through slots 154, into the peripherally enlarged bore portion at outlet 38A and finally through outlet 38A.

Second valve means 138 includes a hollow cylindrical metallic valve member 164 slidably mounted in bore 140 with an O-ring 166 mounted in a groove around a mid-portion thereof and disposed above high pressure bleed port 56A. The lower end of second valve member 164 is frusto-conically shaped forming an inclined annular seat surface to engage a frusto-conically shaped inclined body seat surface 170 around bore 34 on the portion of the valve body connecting enlarged bore portion 140 and bore 134. The lower end of second valve member 164 is provided with a flat surface transverse to the bore which is located in spaced relation to the upper end surface 162 of valve member 164 when pilot valve 130 moves to the high pressure position end surface 162 contacts the second valve member end surface 172 to raise the second valve member 164 from the seated position.

The spring means for this embodiment is substantially the same as that described above with such including a coupler member 96A, spring support members 98A and 102A, outer spring 100A, inner spring 112A, and inner spring support member 104A having an attached inner spring abutment member 110A. The lower end portion of spring support member 104A is provided with a reduced diameter portion indicated at 174 extending through second valve member 164 and having a pointed lower end portion engaged with a recess 176 in the upper end of first valve member 136.

In the lower end portion of valve body 132, a threadedly mounted member 124 is provided. A metallic piston 116A is slidably mounted in a bore through body lower end member 124. A low friction seal assembly 126A is provided on the lower end of piston 116A. Piston 116A has an enlarged portion 178 disposed in an enlarged bore portion formed at the juncture of valve body 132 and body lower end member 124A. A vent passageway 122A is provided through valve body 132 to vent the enlarged bore portion containing piston enlarged portion 178. Inclined seat surfaces 180 and 182 are provided in removable body portion 124A and valve body 132 at the juncture of the bore with the interior of the enlarged bore portion containing piston enlarged portion 178. Enlarged piston portion 178 is provided with frusto-conical edge surfaces 184 and 186 on lower and upper respective ends thereof to sealingly engage seating surfaces 180 and 182 respectively when first valve member 136 is in the low pressure and the high pressure positions respectively.

The operation of pressure pilot valve 130 is the same as the operation of the previously described pilot valve mechanism and to avoid duplication such will not be repeated here. Pilot valve 130 has some features which lend it to use in systems which operate at pressures substantially higher than the range of pressures which the previously described pilot valve mechanism will safely and consistently operate. The fluted valve structure of first valve member 136 provides for opening and closing fluit communication between ports 36A and 38A in a manner which will avoid and prevent O-rings from being displaced from their associated grooves which is a common occurrence for O-rings subjected to high pressures. The metal-to-metal seating of second valve member 138 avoids the problem of O-ring extrusion because O-rings are not used in the area where they would be subjected to high pressures and flow rates. In the lower portion of pilot valve 130 the metal-to-metal seating on opposite sides of piston enlarged portion 178 will present leakage of the fluid medium when the valve is in either the low pressure position or the high pressure position. Metal-to-metal seating in this area is of significant importance in the event of O-ring failure or burn up as a result of a fire.

What is claimed is:

1. A pressure responsive pilot valve mechanism for bleeding a pilot controlled fluid pressure system and responsive to the sensing of a predetermined high or low pressure condition in an associated pressurized primary system, said pilot valve mechanism comprising:

a valve body having an elongated bore therein forming a valve chamber with an open end of said bore being in fluid communication with said pressurized primary system, said valve body having an inlet port, an outlet port, and a bleed port in fluid communication with the bore, said outlet port being connected to an outlet fluid line for the fluid pressure system;

a first valve means comprising a main elongated slide valve mounted within said bore for sliding movement and having an end thereof at one end of said bore exposed to fluid pressure from said pressurized primary system; said slide valve movable between a low pressure position permitting fluid communication between said outlet port and said bleed port, a normal operating position permitting fluid communication between said inlet port and said outlet port while blocking fluid communication to said bleed port, and a high pressure position blocking fluid communication from the outlet port to the inlet port;

means continuously urging said slide valve toward the open end of said bore against fluid pressure from said pressurized system;

a secondary valve means comprising a secondary valve member mounted within the bore adjacent the other end of said slide valve for longitudinal sliding movement relative to said slide valve at least for a portion of its travel, means continuously urging said secondary valve member toward the elongated slide valve;

said slide valve in normal operating position being spaced longitudinally from said secondary valve member and movable longitudinally a limited distance relative to and toward said secondary valve after a predetermined high pressure is reached in said pressurized primary system, said slide valve upon continued movement resulting from the high pressure contacting said secondary valve member and moving with said secondary valve member to said high pressure position; and a high pressure bleed port in said valve body in fluid communication with said outlet fluid line, said secondary valve member in the low pressure and normal operating positions of said slide valve closing the high pressure port and blocking the bleeding of fluid from the fluid line through the high pressure bleed port, said secondary valve member in said high pressure position opening said high pressure bleed port and permitting fluid from the outlet fluid line to by-pass the outlet port to be bled through the high pressure bleed port when the secondary valve member is moved by the slide valve to said high pressure position.

2. The pilot valve mechanism of claim 1 wherein:

said bore has an enlarged diameter portion in fluid communication with said outlet port defining a pair of annular sealing edges and disposed in a spaced relation at the intersection of said bore and opposite ends of said enlarged portion;

said valve chamber includes a second enlarged diameter portion in fluid communication with said inlet port;

said bleed port opening to said bore at a position longitudinally spaced from said outlet port;

said first valve means has a first means and a second sealing means disposed in a spaced relation and separated by a reduced diameter portion, said first sealing means being disposed to block said inlet port upon movement of said first valve means to said high pressure position, said second sealing means being of slightly smaller longitudinal dimension than the spacing of said annular sealing edges such that touching engagement between said second sealing means and one of said annular sealing edges causes said second sealing means to be disposed in slightly spaced relation to the other one of said annular sealing edges; and said first valve means has a second reduced diameter portion on the end portion thereof between said sealing means and a third sealing means at the extreme end portion of said first valve means.

3. The pilot valve mechanism of claim 2 wherein:

said second valve means has a bore therethrough including an enlarged bore portion receiving said extreme end portion of said first valve means and on internal abutment to contact the end of said first valve means end when said valve means moves to said high pressure position; and said third sealing means moves in sealing engagement in said second valve means enlarged bore portion.

4. The pilot valve mechanism of claim 3 wherein:

said first sealing means has a pair of O-rings mounted in peripheral grooves around said first valve means in a spaced relation with said O-rings being substantially wider than said enlarged portion;

said second sealing means has a pair of O-rings mounted in peripheral grooves around said first valve means in a spaced relation with said O-rings being in a slightly smaller longitudinal dimension than the spacing of said annular sealing edges; and said valve chamber has an enlarged diameter bore portion receiving and mounting said second valve means, said second valve means has a pair of spaced O-rings mounted about its periphery on opposite sides of said high pressure bleed port in said normal and low pressure positions.

5. A pilot valve mechanism for connection between a fluid supply inlet line and a fluid outlet line responsive to the sensing of a predetermined high or low pressure condition in an associated pressurized primary system, said pilot valve mechanism comprising:

a valve body having an elongated bore therein forming a valve chamber with an open end of said bore being in fluid communication with said pressurized primary system, said valve body having an inlet port for connection to the supply inlet line, an outlet port for connection to the fluid outlet line, and a main bleed port; said inlet, outlet and bleed ports being in fluid communication with the bore;

a main elongated slide valve mounted within said bore for sliding movement and having an end thereof at one end of said bore exposed to fluid pressure from said pressurized primary system; said slide valve movable between a low pressure position permitting fluid communication between said outlet port and said main bleed port, a normal operating position permitting fluid communication between said inlet port and said outlet port while blocking fluid communication to said main bleed port, and a high pressure position blocking fluid communication from the outlet port to the inlet port;

means continuously urging said slide valve toward the open end of said bore against fluid pressure from said pressurized system;

a secondary valve member mounted within the bore adjacent the other end of said slide valve for longitudinal sliding movement relative to said slide valve at least for a portion of its travel, means continuously urging said secondary valve member toward the elongated slide valve;

said slide valve in normal operating position being spaced longitudinally from said secondary valve member and movable longitudinally a limited distance relative to and toward said secondary valve member after a predetermined high pressure is reached in said pressurized primary system, said slide valve upon continued movement resulting from the high pressure contacting said secondary valve member and moving simultaneously with said secondary valve member to said high pressure position; and a high pressure bleed port in said valve body for connection to the fluid outlet line, said secondary valve member in the low pressure and normal operating positions of said slide valve closing the high pressure port and blocking the bleeding of fluid from the fluid outlet line through the high pressure bleed port, said secondary valve member in said high pressure position opening said high pressure bleed port and permitting fluid from the fluid outlet line to by-pass the outlet port and be bled through the high pressure bleed port when the secondary valve member is moved by the slide valve to said pressure position.

6. A pilot valve mechanism as set forth in claim 5 wherein:

said high pressure bleed port is in fluid communication with said bore and said secondary valve member has a pair of longitudinally spaced O-rings about its periphery on opposite sides of said high pressure bleed port in said low pressure and normal operating positions, said O-rings sealing between the secondary valve member and the bore and defining inner and outer O-rings with respect to the adjacent end of the valve body;

the inner O-ring being moved past said high pressure bleed port in said high pressure position to open said high pressure bleed port.

7. A pilot valve mechanism as set forth in claim 6 wherein said high pressure bleed port is of a relatively large cross-sectional area and said inner O-ring in said high pressure position is positioned intermediate the width of said high pressure bleed port.

8. A pilot valve mechanism as set forth in claim 6 wherein said high pressure bleed port is in fluid communication with said main bleed port in said high pressure position to permit the bleeding of fluid through the main bleed port, said inner O-ring blocking fluid communication between the main bleed port and said high pressure bleed port in said low pressure and normal operating positions.

9. A pilot valve mechanism as set forth in claim 5 wherein said secondary valve member is hollow and receives the adjacent end of the slide valve member therein, said slide valve member having a reduced diameter end portion adjacent said secondary member;

a pair of longitudinally spaced O-rings on opposite ends of said reduced diameter end portion defining inner and outer O-rings with respect to the adjacent end of said slide valve, the inner O-ring of said reduced diameter end portion being positioned between the outlet port and said main bleed port in said normal operating position to block fluid flow therebetween, said inner O-ring of said reduced diameter end portion being moved by said slide valve to open said outlet port to fluid communication with said main bleed port in said low pressure position.

10. A pilot valve mechanism as set forth in claim 9 wherein said outlet port is of a relatively large cross-sectional area and said inner O-ring is positioned in said low pressure position intermediate the width of said outlet port.

11. A pilot valve mechanism as set forth in claim 5 wherein:

said slide valve has a piston thereon adjacent said open end of the bore, said bore having an enlarged diameter portion adjacent said open end and said piston having an enlarged diameter portion positioned within said enlarged diameter portion of the bore, said enlarged diameter portion of said piston being arranged to contact said valve body at one end of said enlarged diameter bore portion to limit movement of the slide valve in said low pressure position and to contact said valve body at the other end of said enlarged diameter bore portion at said high pressure position to limit movement of the slide valve;

said enlarged diameter piston portion having annular metal sealing edges on opposed ends thereof, said valve body having annular metal seats around said bore at opposed ends of said enlarged diameter bore portion to engage the associated sealing edges at said low pressure and high pressure positions.

12. A pilot valve mechanism as set forth in claim 11 wherein: said secondary valve member is hollow and receives said slide valve, the inner end of said secondary valve member with respect to the adjacent end of the valve body having an annular metal sealing edge, and said valve body having an annular metal seating surface for said sealing edge radially outwardly of said slide valve, said secondary valve member being urged into seating engagement with said seating surface at said low pressure and normal operation positions.

13. A pilot valve mechanism for connection between a fluid supply inlet line and a fluid outlet line responsive to the sensing of a predetermined high or low pressure condition in an associated pressurized primary system, said pilot valve mechanism comprising:

a valve body having a elongated bore therein forming a valve chamber with an open end of said bore being in fluid communication with said pressurized primary system; said valve body having an inlet port for connection to the inlet line, an outlet port for connection to the outlet line, and a main bleed port; said inlet, outlet and bleed ports being in fluid communication with the bore;

a main elongated slide valve mounted within said bore for sliding movement and having an end thereof at one end of said bore exposed to fluid pressure from said pressurized primary system; said slide valve movable between a low pressure position permitting fluid communication between said outlet port and said main bleed port, a normal operating position permitting fluid communication between said inlet port and said outlet port while blocking fluid communication to said bleed port, and a high pressure position blocking fluid communication from the outlet port to both the bleed port and the inlet port;

a small diameter low pressure spring within the bore continuously urging said slide valve toward the open end of said bore against fluid pressure from said pressurized system, a large diameter high pressure spring mounted within the bore in concentric relation to said small diameter low pressure spring;

a second valve means comprising a secondary valve member mounted between said other end of said slide valve and said high pressure spring for longitudinal sliding movement relative to said slide valve at least for a portion of its travel, said high pressure spring continuously urging said secondary valve member toward the elongated slide valve;

said slide valve in normal operating position being spaced longitudinally from said secondary valve member and movable longitudinally a limited distance relative to and toward said secondary valve member/after a predetermined high pressure is reached in said pressurized primary system, said slide valve upon continued movement resulting from the high pressure contacting said secondary valve member and moving with said secondary valve member against the bias of said large diameter spring to said high pressure position;

a high pressure bleed port in fluid communication with said bore for connection to said outlet line, said secondary valve member having a pair of longitudinally spaced O-rings about its periphery on opposite sides of said high pressure bleed port in said low pressure and normal operating conditions to close the high pressure bleed port and block the bleeding of fluid therefrom;

said O-rings sealing between the secondary valve member and the bore and defining inner and outer O-rings with respect to the adjacent end of the valve body, the inner O-ring being moved with said secondary valve member by said slide valve past said high pressure bleed port in the high pressure position to open said high pressure bleed port; and sealing means between said slide valve and said bore to block the flow of fluid from said outlet port in said high pressure condition thereby to permit said outlet port to be by-passed in the high pressure position.

14. A pilot valve mechanism as set forth in claim 13 wherein said high pressure bleed port is in fluid communication with said main bleed port in said high pressure position to permit the bleeding of fluid through the main bleed port from the high pressure bleed port, said slide valve having a reduced diameter portion positioned in the bore between the main bleed port and the high pressure bleed port at said high pressure position to provide fluid communication therebetween.

* * * * *